Figure 1:
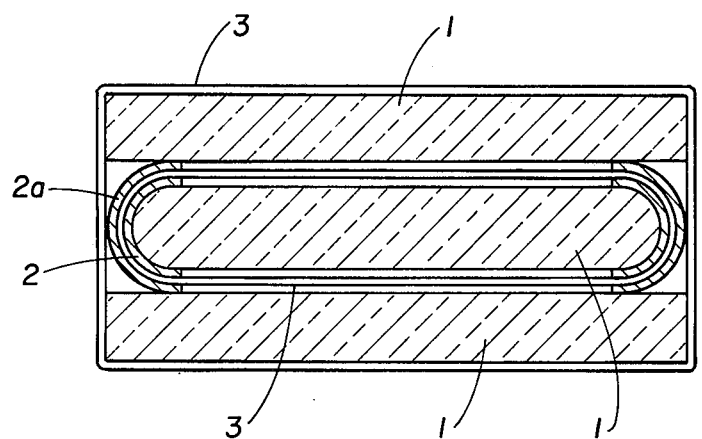

United States Patent
Wichterle et al.

[11] 3,915,172
[45] Oct. 28, 1975

[54] CAPILLARY DRAIN FOR GLAUCOMA

[75] Inventors: Otto Wichterle; Lubomír Krejčí, both of Prague, Czechoslovakia

[73] Assignee: Ceskoslovenska akademie ved, Prague, Czechoslovakia

[22] Filed: Mar. 26, 1973

[21] Appl. No.: 344,477

Related U.S. Application Data

[62] Division of Ser. No. 144,806, May 19, 1971, Pat. No. 3,767,759.

[30]  Foreign Application Priority Data

May 27, 1970  Czechoslovakia .................. 3706-70

[52] U.S. Cl.................................... 128/350 R; 3/1
[51] Int. Cl.²........................................ A61M 27/00
[58] Field of Search............ 128/348, 350 R, 350 V, 128/334 R; 3/1

[56]  References Cited
UNITED STATES PATENTS

| | | | |
|---|---|---|---|
| 3,159,161 | 12/1964 | Ness................................ | 128/350 R |
| 3,220,960 | 11/1965 | Wichterle et al. ..................... | 3/1 X |
| 3,788,327 | 1/1974 | Donowitz et al................ | 128/350 R |

OTHER PUBLICATIONS

Ellis, Amer. Jour. Ophthal., 50:733–742, 1960.
Ore et al., Surgery, Vol. 52, No. 2, Aug. 1962, pp. 385–390.
Lancet — Dec. 1, 1962, p. 1150.

*Primary Examiner*—Dalton L. Truluck

[57]  ABSTRACT

The invention relates to a capillary drain consisting of a flat bundle of capillaries made from hydrogels and suitable particularly for treating glaucoma in opthalmology. The drain is manufactured so that a system of parallel fibers or filaments is laid between parallel plates separated from each other by flat thin distance inserts or gaskets, an initiated monomer mixture suitable for producing water-swellable cross-linked hydrogels is filled into the mold thus obtained, the monomer mixture is allowed to polymerize under cross-linking conditions, the mold is removed and the fibers or filaments removed e.g., by dissolving or melting or pulling them out.

6 Claims, 2 Drawing Figures

U.S. Patent  Oct. 28, 1975  3,915,172

CAPILLARY DRAIN FOR GLAUCOMA

This is a divisional application of Ser. No. 144,806 filed May 19, 1971 now U.S. Pat. No. 3,767,759.

BACKGROUND OF THE INVENTION

Glaucoma was treated hitherto by a filtering or draining process, using various implants such as tantalum or platinum wires, nylon fibers or capillary tubings and the like. The results of such operations were mostly unsatisfactory and the authers used to describe experiments on test animals, only few operations on human patients having been recorded. A follow up after a long time of the patients showed in most cases either blocking in the neighborhood of the drain or blocking of the drain itself as a result of high proliferation, or, in some cases, lack of toleration of such implants and their sooner or later elimination.

According to the invention, novel drains free of the above mentioned shortcomings are manufactured in the form of flat capillary bundles from physiologically inert hydrogels containing about 40 % by weight or more of water in swollen condition. The manufacture is carried out using a mold consisting of a system of parallel inert plates (e.g., from glass separated from each other by thin gaskets, a layer of parallel fibers or filaments being laid between each two plates. The cavities of the system are then completely filled up with a monomer mixture capable of polymerizing to a cross-linked hydrogel, or, alternatively, by a monomer mixture which may be, upon polymerization, transformed into a hydrogel by a suitable chemical reaction such as partial hydrolysis or the like. The filaments do not permanently bond to the monomer mixture but are insoluble therewith so that they remain during polymerization. After polymerization is finished, however, the mold is dismounted and the fibres, the ends of which are naked, removed by pulling them off or by dissolving them in a suitable solvent not affecting adversely the polymer, or by melting them out. The drain thus obtained is then washed and sterilized.

Another object of the invention is the mold itself. It is clear that the simplest mold will consist of two plates, having a size corresponding to a single drain. Economically more suitable is a composite mold consisting of more than two, e.g. of 3 to 21 plates, the size of which may be a multiple of that of a single drain. Thin gaskets are inserted between two opposite edges of the plates. They may be made from any suitable inert material such as paper, plastic foil or metal sheet or foil. Between each two neighboring plates a layer of parallel fibers is laid. The whole system is held together by any appropriate means such as a nylon or rubber filament, metal or plastic clasps or clips, or by scotch tape.

The size of the drains, the thickness of the fibers and gaskets depends on the desired end use. For ophthalmic drains for treating glaucoma, the flat capillary bundle used as drain is from 2 to 4 mm wide and from 4 to 10 mm long, according to the kind of the chosen operation. One milimeter of a capillary bundle having capillaries from 0.08 to 0.1 mm thick corresponds to about 9 parallel capillaries, warranting, if fore chamber and subconjunctical space (or suprachorioidal space) were joint, filtering off not only the chamber water, but also particles formed during the operation or in the postoperational period in fore chamber, e.g., blood cells, inflammatory cells or exudation.

Experimental testing of the operation of an implant manufactured according to the invention was carried out on rabbits (total number of operated eyes amounting to 150). There were used two different methods of draining operations:

1. Connection of fore chamber with subconjunctival space, a filter cushion being formed;
2. Modified cyclodialysis, fore chamber being connected with suprachorioidal space.

The merits of this new type of operation, using the implants according to the invention, may be summarized as follows:

a. The material introduced into the eye interior is inert and well compatible with living tissue;
b. The draining ability of the implant is quite sufficient as it was proved by repeated experimental provocation of glaucomatosic attacks in various periods of time;
c. Histologic tests after various time intervals from one to twelve months showed a very good healing in of the implants in operation wounds, with but a small cicatrix. The capillaries of the implant were not blocked by cells, proliferating tissue did not grow along the implant into the fore chamber. Using the other type of operation — modified cyclodialysis — retina and uvea never were loosened.

Favorable results of the animal tests made it possible to choose human patients for operations. Up to the end of 1970, 15 successful operations were carried out. The pressure in the eye interior decreased and the eyes, previously very painful, were calmed and the patients are subjectively free of complaint. Objective findings proved that this kind of operation, using drains according to the invention, may be used in ophthalmology in indicated cases.

Figure 2:
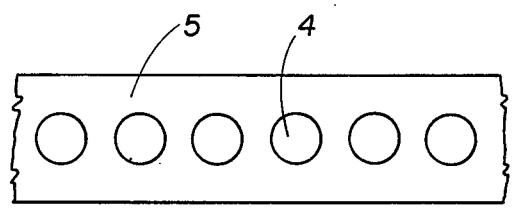

The invention is further illustrated by the annexed drawing,

FIG. 1 showing a cross section through the mold,
FIG. 2 presenting an enlarged cross section of the finished drain.

The mold in FIG. 1 consists of three plates 1, the middle one forming a partition between two covering ones. The plates may be from glass, e.g. diapositive glass plates 50×50 mm. Two opposite edges of the middle plate are provided with flexible inserts 2, made e.g., from paper. Round the flexible inserts there is wound very tightly in a single layer a nylon monofilament 0.03 – 0.2 mm thick. The filament is wound parallel with the two free edges of the plates. Further distancing inserts 2 are laid on to the filaments along the edges perpendicular to the winding and the two covering glass plates are fixed on the said inserts e.g., by winding tightly a filament round the mold as a whole.

The mold may, of course, consist of more plates and inserts than shown in FIG. 1 of the drawing.

The finished drain (FIG. 2) from the hydrophilic gel 5 contains capillary passages 4, formed by removing the filament after the polymerization.

Further details of the invention are illustrated by following Examples which, however, do not present the only possible embodiment thereof.

EXAMPLE 1

Two strips of paper were folded over two opposite edges of a 50×50 mm glass plate and a nylon 6 monofilament 0.08 mm thick was wound round the plate so that the windings were 0.1 mm apart. Similar strips of paper were folded over the winding along the edges perpendicular to the filament. Both sides were covered by similar glass plates 50×50 mm and the whole was fastened together by means of a nylon 6 monofilament, wound tightly round it. A monomer mixture was prepared from 60 parts by weight of hydroxyethyl methacrylate, containing 0.25 % of ethylene glycol dimethacrylate, 40 parts of anhydrous glycerol and 0.8 p. of di-isopropyl percarbonate. The mixture was shortly degasified at ambient temperature, using 1 Torr vacuum, and then filled into the mold. The filled mold was put into a thermostat heated to 70°C and filled with carbon dioxide. After 25 minutes the mold was taken out, the covering glass plates scratched on their surfaces and broken by several sharp blows. The mold was then put into 60°C water for several hours. Then the broken glass could be easily loosened. After several further hours of keeping the mold in warm water the hydrogel having the nylon 6 filaments was cut off by a sharp knife along the paper stripes and left in distilled water overnight to remove the glycerol. The swelled foil thus obtained was immersed for 15 hours into 40% sulfuric acid, the paper covered edges having been previously cut off. The foil was slightly pressed between two glass plates so that the capillaries were lying particularly, and 40 % sulfuric acid was slowly poured onto the top at such a rate that it flowed but through the capillaries. Only first portions of the eluate contained some polyamide, precipitating in a surplus of water. To be sure that all of the nylon was removed, about 10 ml of diluted sulfuric acid was put through. The acid was then fully removed by washing in distilled water and the drain immersed into physiologic sodium chloride solution until swelling equilibrium was attained. The resulting drain was 0.75 mm thick, with capillaries having 0.17 mm diameter. The thickness of the hydrogel between the capillaries was from 0.01 to 0.05 mm, the outer wall being about 0.2 mm thick. The sterilized drain was used for treating glaucoma.

EXAMPLE 2.

The process described in EXAMPLE 1 was repeated except that scotch tape was used instead of paper strips, thickness of the type being from 0.05 to 0.06 mm. The monomer mixture consisted of 6 parts by volume of hydroxyethyl methacrylate, containing 0.3 % of glycol dimethacrylate, 4 p. of glycerol and 0.04 p. of di-isopropyl percarbonate. Instead of nylon filament, a similar monofilament from oriented polyester formed from adipic acid and ethylene glycol, 0.1 mm thick, was used. The filament was removed from the finished hydrogel by melting out in boiling water.

EXAMPLE 3

The process according to EXAMPLE 1 was repeated except that paper 0.095 mm thick was used as distancing insert and the nylon filament made was replaced by a 0.06 mm thick filament from chlorinated polyvinyl chloride. After the polymerization had finished the filament was dissolved by means of an acetone - ethyl alcohol mixture. The monomer mixture consisted of 21 p. by volume of hydroxyethyl methacrylate (containing 0.42 % of dimethacrylate), 14 p. by volume of glycerol and 0.14 p. by volume of di-isopropyl percarbonate.

EXAMPLE 4

In the process described in EXAMPLE 1 a mold of the same kind was prepared using glass fibers 0.1 mm thick and 20 mm long, made from a glass which was fully soluble in hydrofluoric acid. The fibers were glued on the central plate by means of a viscous solution of sodium polyacrylate. The monomer mixture consisted of a 68 % aqueous zinc chloride solution (concentration 70 % by weight), 10 % of acrylonitrile, 20 % of acrylamide, 0.1 % of ammonium persulfate, 0.1 % of potassium metabisulfite, the latter redox constituents being added in the form of 10 % aqueous solutions. Prior to adding the redox initiator, the solution was cooled down to −10°C. The polymerization was performed at −5°C ambient temperature and lasted 3 hours. Zinc chloride was washed out by distilled water, its first portions being acidified to pH 2 with hydrochloric acid. The last traces of zinc were removed in a 0.5% sodium hydrocarbonate aqueous solution. The glass fibers were pulled out. In the case that all of the fibers could not be pulled out, the whole was immersed into diluted hydrofluoric acid until the glass fibers were fully dissolved. The drain was then thoroughly washed in distilled water and put into sterile physiotogical saline solution. It could be used in the same way as drains made according to foregoing EXAMPLES.

It is clear that other physiologically inert hydrogels can be used for the same purpose, such as gels made from polymers and copolymers of acrylamide, methacrylamide, alkyl substituted acrylamide or methacrylamide respectively, acrylic or methacrylic acid, adding methacrylonitrile or acrylonitrile as an essentially non-hydrophilic monomer to control the swelling degree in water. Further possible co-monomers are vinyl pyrrolidone, glycidyl methacrylate, esters of acrylic and methacrylic acids with lower aliphatic alcohols etc. Advantageously, the proportion of the less hydrophilic monomer is chosen so that the content of water in the hydrogel at swelling equilibrium in neutral solutions is from about 30 to about 85 %, preferably from about 40 to about 60 % by weight.

As cross-linking agent, every stable more-than-bifunctional monomer can be used, such as N,N-methylene-bis-methacrylamide, divinyl sulfone, Lriacryloyl perhydrotriazine etc. If acrylontrile, acrylamide or acrylic acid are polymerized or copolymerized at a concentration of 20 – 50 % by weight in a solvent with a very low chain transfer constant such as concentrated nitric acid or aqueous zinc chloride solution, no cross-linking agent need be added because cross-linkages are formed by chain transfer onto the monomer. Polyacrylonitrile gel obtained by polymerization of acrylonitrile in said inorganic solvents is then transformed into hydrogel by partial hydrolysis resulting in a block copolymer of acrylonitrile, acrylamide and a small portion of acyrlic acid. Hydrogels thus obtained display very high strength and elasticity, combined with good compatibility with living tissue.

Drains according to the invention may be used in surgery not only in treating glaucoma, but in all cases where discharging of body liquids is necessary, such as exudations from sick organs, operation wounds etc.

What we claim is:

1. A surgical opthalmic drain for treating glaucoma comprising a sheet of a homogeneous physilogically inert hydrogel having a plurality of spaced capillary passages open at each end arranged parallel to the surface of said sheet and to each other whereby particles, such as cells, as well as fluid may be passed through the capillary passages.

2. Capillary drain according to claim 1 wherein said hydrogel contains about 30 to about 85% by weight of water in the swollen condition.

3. Capillary drain according to claim 1 wherein said hydrogel contains about 40 to about 60% by weight of water in the swollen condition.

4. Capillary drain according to claim 1 wherein said hydrogel is prepared from a monomer mixture comprising hydroxyethyl methacrylate, ethylene glycol dimethacrylate and anhydrous glycerol.

5. Capillary drain according to claim 1 wherein said hydrogel is prepared from a monomer mixture comprising aqueous zinc chloride, acrylonitrile and acrylamide.

6. The drain according to claim 1 wherein the capillary passages are each in the range of from 0.03 to 2mm in diameter.

* * * * *